United States Patent
Imaizumi et al.

(10) Patent No.: US 10,988,879 B2
(45) Date of Patent: Apr. 27, 2021

(54) SEWING MACHINE AND HOLDER MEMBER

(71) Applicant: BROTHER KOGYO KABUSHIKI KAISHA, Nagoya (JP)

(72) Inventors: Kazutaka Imaizumi, Nagoya (JP); Mitsuhiro Iida, Gifu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 104 days.

(21) Appl. No.: 16/388,920

(22) Filed: Apr. 19, 2019

(65) Prior Publication Data

US 2019/0242045 A1    Aug. 8, 2019

Related U.S. Application Data

(63) Continuation of application No. PCT/JP2017/024789, filed on Jul. 6, 2017.

(30) Foreign Application Priority Data

Oct. 31, 2016  (JP) .............................. JP2016-213023

(51) Int. Cl.
*D05B 39/00* (2006.01)
*D05B 19/08* (2006.01)
(Continued)

(52) U.S. Cl.
CPC ........... *D05B 19/08* (2013.01); *D05B 19/006* (2013.01); *D05B 39/00* (2013.01); *D05C 5/02* (2013.01);
(Continued)

(58) Field of Classification Search
CPC .......... D05B 19/08; D05B 39/00; D05C 1/02; D05C 9/04; G06T 2207/30204
See application file for complete search history.

(56) References Cited

U.S. PATENT DOCUMENTS

2008/0289553 A1* 11/2008 Yamada ................. D05B 19/08
                                                         112/470.04
2014/0230708 A1    8/2014 Suzuki et al.
(Continued)

FOREIGN PATENT DOCUMENTS

JP       H11-051651 A     2/1999
JP       2011-112401 A    6/2011
(Continued)

OTHER PUBLICATIONS

Sep. 26, 2017 International Search Report issued in International Patent Application No. PCT/JP2017/024789.
(Continued)

*Primary Examiner* — Tajash D Patel
(74) *Attorney, Agent, or Firm* — Oliff PLC

(57) ABSTRACT

The sewing machine includes an imaging unit, a conveyor portion, a processor, and a memory. The imaging unit has an image capture range, and is configured to capture an image of a holder member. The conveyor portion is configured to convey the holder member relative to the imaging unit in a first and a second direction. The processor performs processes. The processes include causing the imaging unit to capture the image of the holder member that has entered the image capture range. The processes include acquiring first image data that is data of a first image representing the image of the holder member. The processes include identifying a predetermined marker from the first image of the acquired first image data. The processes include determining whether an inclination angle of the holder member exceeds a predetermined value on the basis of a variable acquired on the basis of the identified marker.

9 Claims, 16 Drawing Sheets

(51) Int. Cl.
  *D05B 19/00* (2006.01)
  *G06T 7/73* (2017.01)
  *G06T 5/00* (2006.01)
  *D05C 5/02* (2006.01)
  *G06T 3/40* (2006.01)

(52) U.S. Cl.
  CPC ............ *G06T 3/4038* (2013.01); *G06T 5/006* (2013.01); *G06T 7/73* (2017.01); *G06T 7/74* (2017.01); *G06T 2207/30204* (2013.01)

(56) References Cited

U.S. PATENT DOCUMENTS

| | | | |
|---|---|---|---|
| 2015/0059631 A1 | 3/2015 | Katano et al. | |
| 2015/0259837 A1 | 9/2015 | Tokura | |
| 2016/0032508 A1 | 2/2016 | Tokura | |
| 2018/0258569 A1* | 9/2018 | Kamihira | D05B 19/12 |
| 2019/0338450 A1* | 11/2019 | Kawaguchi | D05B 39/00 |

FOREIGN PATENT DOCUMENTS

| | | |
|---|---|---|
| JP | 2014-155579 A | 8/2014 |
| JP | 2015-048537 A | 3/2015 |
| JP | 2015-173774 A | 10/2015 |
| JP | 2016-032596 A | 3/2016 |

OTHER PUBLICATIONS

Apr. 30, 2019 International Preliminary Report on Patentability issued in International Patent Application No. PCT/JP2017/024789.

* cited by examiner

SEWING MACHINE AND HOLDER MEMBER

CROSS-REFERENCE TO RELATED APPLICATION

This application is a continuation application of International Application No. PCT/JP2017/024789, filed Jul. 6, 2017, which claims priority from Japanese Patent Application No. 2016-213023, filed on Oct. 31, 2016. The disclosure of the foregoing application is hereby incorporated by reference in its entirety.

BACKGROUND

The present disclosure relates to a sewing machine and a holder member.

A sewing machine provided with an imaging unit is known. The sewing machine is provided with an image sensor, a holder member, and a moving mechanism. The image sensor is one example of the imaging unit, and has a predetermined image capture region. The holder member has a rectangular shape in a plan view, and holds an object of image capture by the image sensor. One end portion of the holder member is inserted into the moving mechanism, and the holder member is mounted on the moving mechanism. The moving mechanism moves the holder member in an X direction and a Y direction. As a result, the moving member moves the object of image capture entering the image capture region of the image sensor. The sewing machine causes the image sensor to continuously capture images of the object of image capture. The sewing machine generates a composite image representing the entire object of image capture, by combining a plurality of partial images captured by the image sensor.

SUMMARY

With the sewing machine describe above, because one end portion of the holder member is held to the moving mechanism, there is a possibility that the holder member will become inclined such that the other end portion faces downward. However, the sewing machine described above is unable to detect inclination of the object of image capture that is held by the holder member. Therefore, if two partial images captured consecutively by the image sensor overlap each other more than is necessary due to the object of image capture being inclined, the sewing machine may not be able to generate a good composite image.

Various embodiments of the broad principles derived herein provide a sewing machine capable of determining whether an object of image capture is being held inclined, and a holder member capable of causing the sewing machine to determine whether the object of image capture is being held inclined.

Embodiments herein provide a sewing machine provided with a sewing portion that sews a sewing object. The sewing machine includes an imaging unit, a conveyor portion, a processor, and a memory. The imaging unit has a predetermined image capture range, and is configured to capture an image of a holder member. The holder member is configured to hold an object of image capture. The conveyor portion is configured to convey the holder member relative to the imaging unit in a first direction and a second direction that are different from each other. The memory stores computer-readable instructions that, when executed by the processor, instruct the sewing machine to perform processes. The processes include causing the imaging unit to capture the image of the holder member that has entered the image capture range by controlling the imaging unit and the conveyor portion. The processes include acquiring first image data that is data of a first image representing the image of the holder member that was captured by the imaging unit. The processes include identifying a predetermined marker from the first image of the acquired first image data. The processes include determining whether an inclination angle of the holder member exceeds a predetermined value on the basis of a variable acquired on the basis of the identified marker. The variable being a variable corresponding to a degree of inclination of the holder member that inclines with respect to the first direction. The holder member is inclined toward a third direction orthogonal to the first direction and the second direction.

Embodiments herein also provide a holder member of a sewing machine provided with an imaging unit having a predetermined image capture range, which holds an object of image capture to be captured by the imaging unit. The holder member includes a mounting portion and a plurality of markers. The mounting portion is mounted to a conveying portion of the sewing machine and is extending in a predetermined direction. The plurality of markers is provided lined up and spaced apart in a direction intersecting the predetermined direction, and is configured to enter the image capture range. The plurality of the markers each has the same shape.

BRIEF DESCRIPTION OF THE DRAWINGS

Embodiments will be described below in detail with reference to the accompanying drawings in which.

DETAILED DESCRIPTION

Hereinafter, embodiments will be explained with reference to the drawings. The configuration of a multi-needle sewing machine 1 (hereinafter, simply referred to as sewing machine 1) of the embodiment will be explained with reference to FIG. 1 to FIG. 3. The upper side, the lower side, the diagonally lower left side, the diagonally upper right side, the diagonally upper left side, and the diagonally lower right side in FIG. 1 are the upper side, the lower side, the front side, the rear side, the left side, and the right side of the sewing machine 1, respectively.

Figure 1:
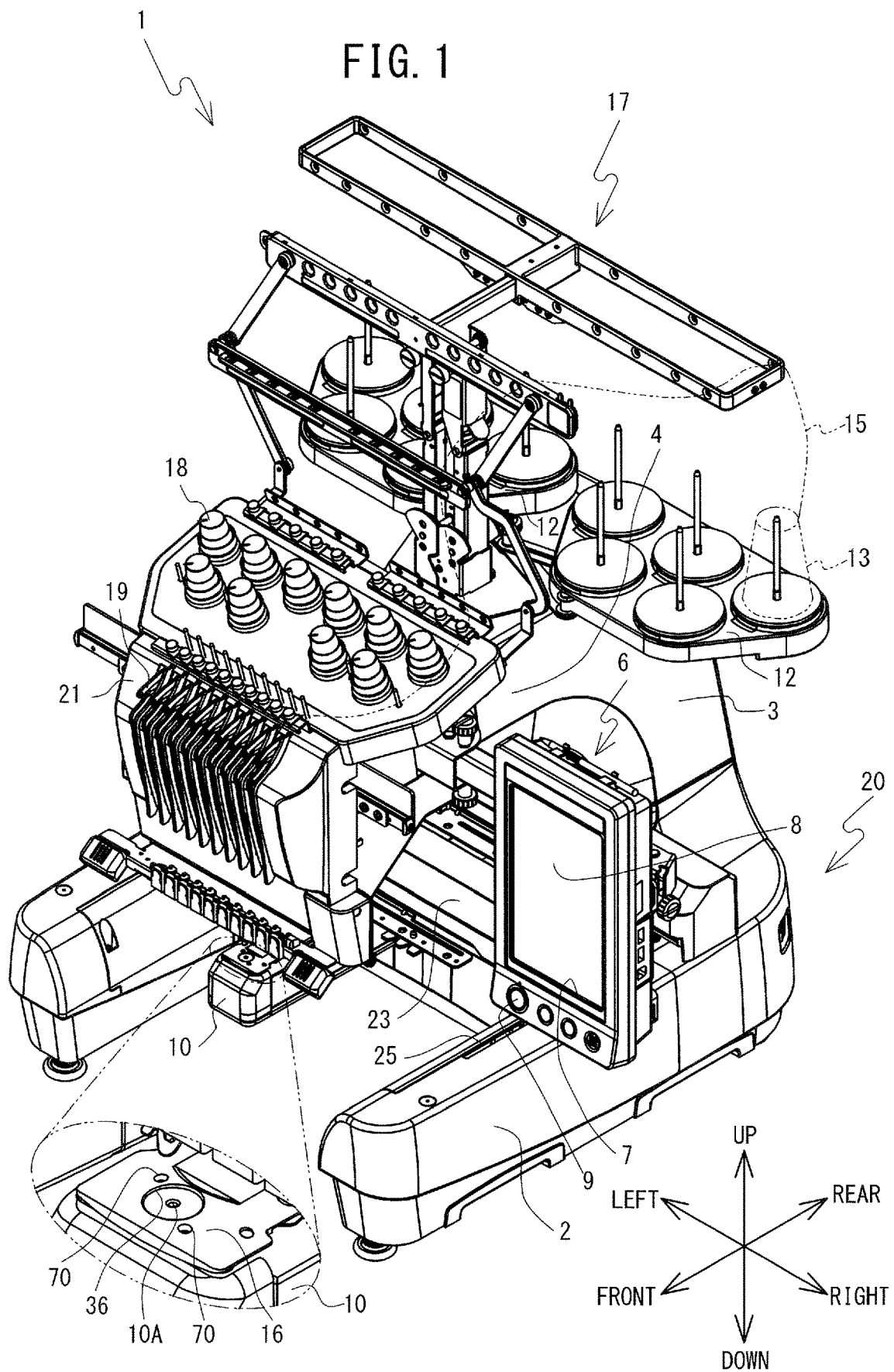
FIG. 1 is a perspective view of a sewing machine.
Figure 2:
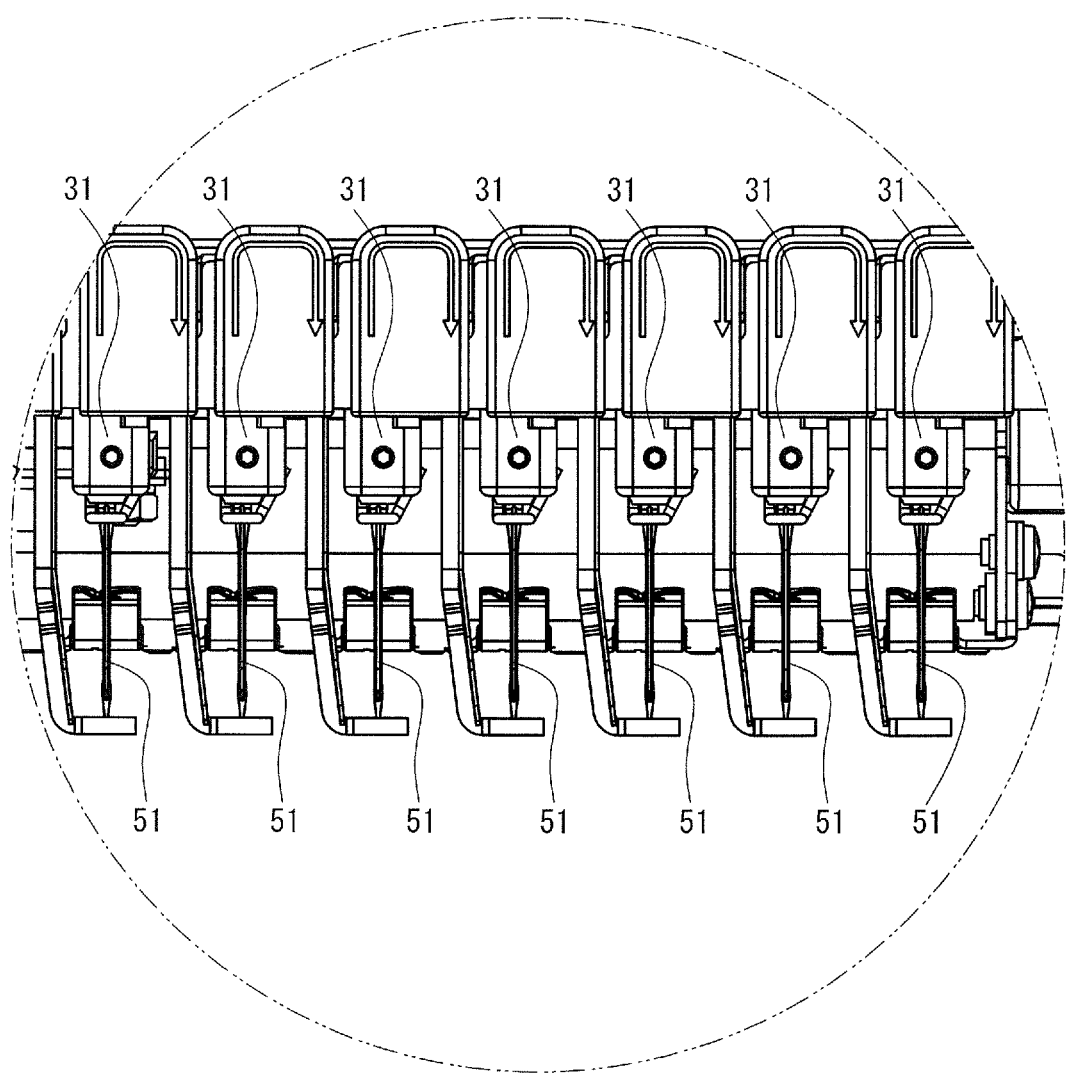
FIG. 2 is a front view of a needle bar.

A body 20 of the sewing machine 1 is mainly provided with a support portion 2, a pillar 3, and an arm portion 4, as shown in FIG. 1 and FIG. 2. The support portion 2 is a base portion formed in an inverted U-shape in a plan view. A pair of left and right guide grooves 25 that extend in the front-rear direction are provided in an upper surface of the support portion 2. The pillar 3 extends upward from a rear end portion of the support portion 2. The arm portion 4 extends forward from an upper end portion of the pillar 3. A needle bar case 21 is mounted to a front end of the arm portion 4 such that the needle bar case 21 is able to move in the left-right direction. Ten needle bars 31 (refer to FIG. 2) that extend in the up-down direction are arranged at equidistant intervals in the left-right direction inside the needle bar case 21. The needle bars 31 are moved up and down by a needle bar case motor 35 (refer to FIG. 6) provided inside the needle bar case 21.

A sewing needle 51 is mounted on the lower end of each of the needle bars 31. The sewing machine 1 performs sewing on a sewing object (not shown in the drawings) by moving the needle bars 31 on which the sewing needles 51 are mounted up and down.

An operating unit 6 is provided on the right side of the arm portion 4. The operating unit 6 is provided with a liquid crystal display 7 (hereinafter, referred to as LCD 7). An image that includes various items such as commands, illustrations, setting values, and messages, for example, is displayed on the LCD 7. A touch panel 8 is provided on the front surface of LCD 7. A user can perform a pressing operation with respect to the touch panel 8 using a finger or a touch pen. Hereinafter, this operation will be referred to as a panel operation. The touch panel 8 detects the position pressed by the finger or touch pen, and the sewing machine 1 (more specifically, a CPU 61 that will be described later) recognizes the item corresponding to the detected position. The user can select various commands and the like by the panel operation.

A cylinder bed 10 is provided below the arm portion 4. The cylinder bed 10 has cylindrical shape extends forward from a lower end portion of the pillar 3. A shuttle (not shown in the drawings) is provided inside a tip end portion of the cylinder bed 10. The shuttle can accommodate a bobbin (not shown in the drawings) around which a lower thread (not shown in the drawings) is wound. A shuttle driving mechanism (not shown in the drawings) is provided inside the cylinder bed 10. The shuttle driving mechanism rotatably drives the shuttle. Hereinafter, the shuttle driving mechanism and the needle bars 31 will collectively be referred to as a sewing portion 32 (refer to FIG. 6). A needle plate 16 is provided on the upper surface of the cylinder bed 10. A recessed portion 36 has a circular shape and is provided on the needle plate 16. A needle hole 10A is provided in the center of this recessed portion 36. Also, two mounting portions 70 are formed on the needle plate 16. The needle hole 10A passes through the needle plate 16 in the up-down direction. As the needle bar 31 moves down, the lower end of the sewing needle 51 passes through the needle hole 10A and reaches the shuttle. The two mounting portions 70 are holes, for example. The mounting portions 70 are arranged in a straight line with the recessed portion 36 in between. A protruding member 80 (refer to FIG. 4) that will be described later can be attached to and detached from the mounting portions 70.

A pair of left and right spool bases 12 are provided on a rear portion of the upper surface of the arm portion 4 shown in FIG. 1. Ten spools 13, which is the same number as the number of needle bars 31, can be installed on the spool bases 12. An upper thread 15 is supplied from the spools 13 installed on the spool bases 12. The upper thread 15 is supplied to an eye (not shown in the drawings) of the sewing needle 51 mounted to the lower end of the needle bar 31, via a thread guide 17, a tensioner 18, and a thread take-up lever 19 and the like.

A Y carriage 23 (refer to FIG. 1 and FIG. 3) of a moving mechanism 11 (refer to FIG. 6) is provided below the arm portion 4. An embroidery frame (not shown in the drawings) or a holder member 150 can alternatively be attached to a holder 24 of the moving mechanism 11. The embroidery frame holds the sewing object (not shown in the drawings). The holder member 150 holds an object of image capture 99. When mounted to the holder 24, the embroidery frame and the holder member 150 are held by the holder 24 with a space above the cylinder bed 10, i.e., not contacting the cylinder bed 10. The moving mechanism 11 conveys the embroidery frame or the holder member 150 forward, backward, and left and right, using an X-axis motor 132 (refer to FIG. 6) and a Y-axis motor 134 (refer to FIG. 6) as drive sources.

The moving mechanism 11 is provided with the holder 24, an X carriage 22, an X-axis driving mechanism (not shown in the drawings), the Y carriage 23, and a Y-axis driving mechanism (not shown in the drawings). The holder 24 has a plate shape that is long in the left-right direction in a plan view. The X carriage 22 supports the holder 24. The X-axis driving mechanism supports the rear portion of the X carriage 22 by a substantially cantilevered structure. The X-axis driving mechanism is provided with a linear moving mechanism (not shown in the drawings). The linear moving mechanism is provided with a timing pulley (not shown in the drawings) and a timing belt (not shown in the drawings), and moves the X carriage 22 in the left-right direction (X direction) using the X-axis motor 132 as the drive source.

The Y carriage 23 is a box-shaped member that is long in the left-right direction. The Y carriage 23 supports the X-axis driving mechanism so as to enable the X-axis driving mechanism to move in the left-right direction. The Y-axis driving mechanism (not shown in the drawings) is provided with a pair of left and right movable bodies (not shown in the drawings), and a linear moving mechanism (not shown in the drawings). The movable bodies are connected to a lower portion on both left and right ends of the Y carriage 23, and pass through the guide grooves 25 (refer to FIG. 1) in the up-down direction. The linear moving mechanism is provided with a timing pulley (not shown in the drawings) and a timing belt (not shown in the drawings), and moves the movable bodies in the front-rear direction (Y direction) along the guide grooves 25, using the Y-axis motor 134 as the drive source. The Y carriage 23 that is connected to the movable bodies, and the X carriage 22 that is supported by the Y carriage 23, move in the front-rear direction (Y direction) as the movable bodies move.

Figure 3:
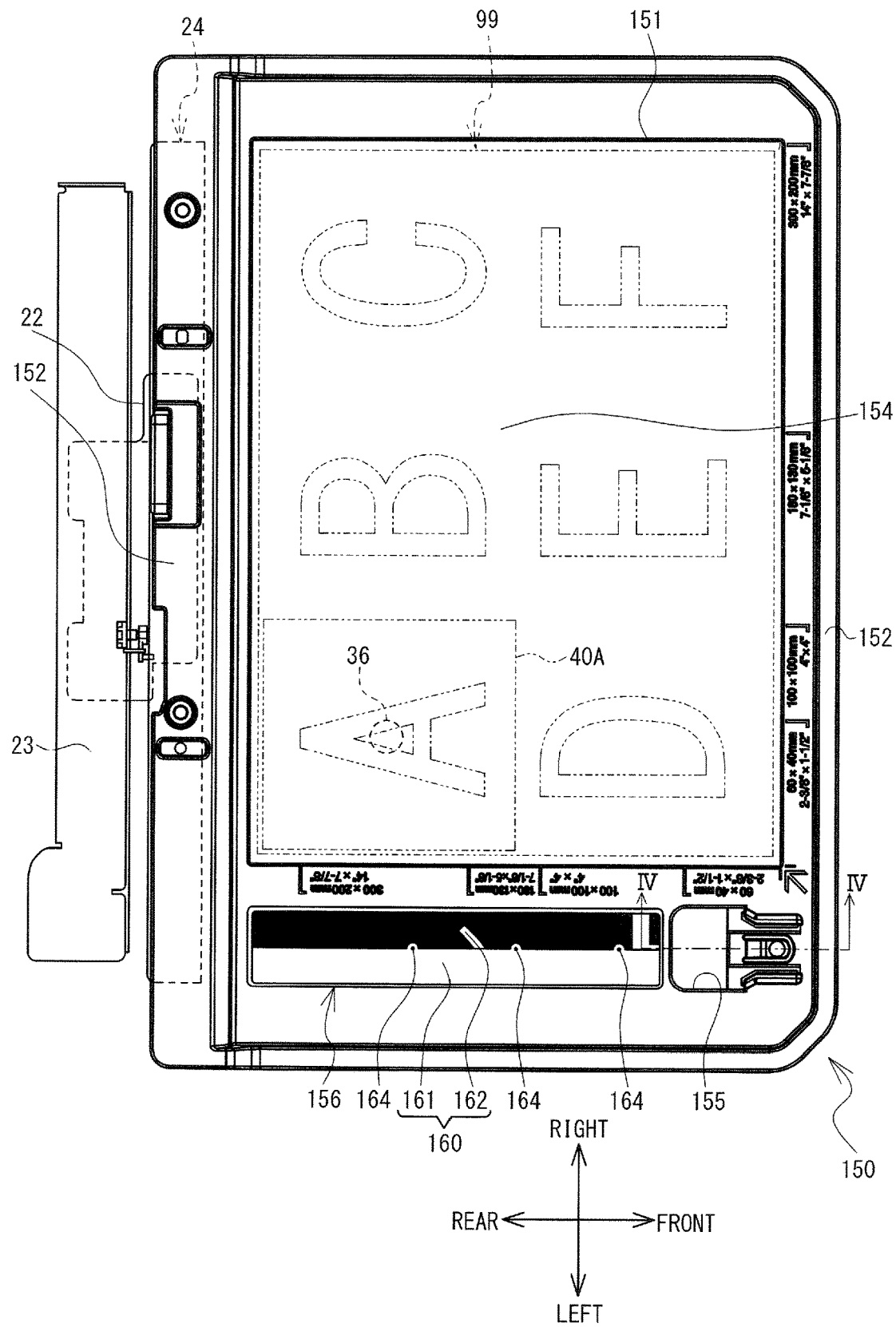
FIG. 3 is a plan view of a holder member.

The holder member 150 will be explained with reference to FIG. 3. The lower side, the upper side, the right side, the left side, the front side of the paper, and the back side of the paper in FIG. 3 are the left side, the right side, the front side, the rear side, the upper side, and the lower side of the holder member 150, respectively.

Figure 11A:
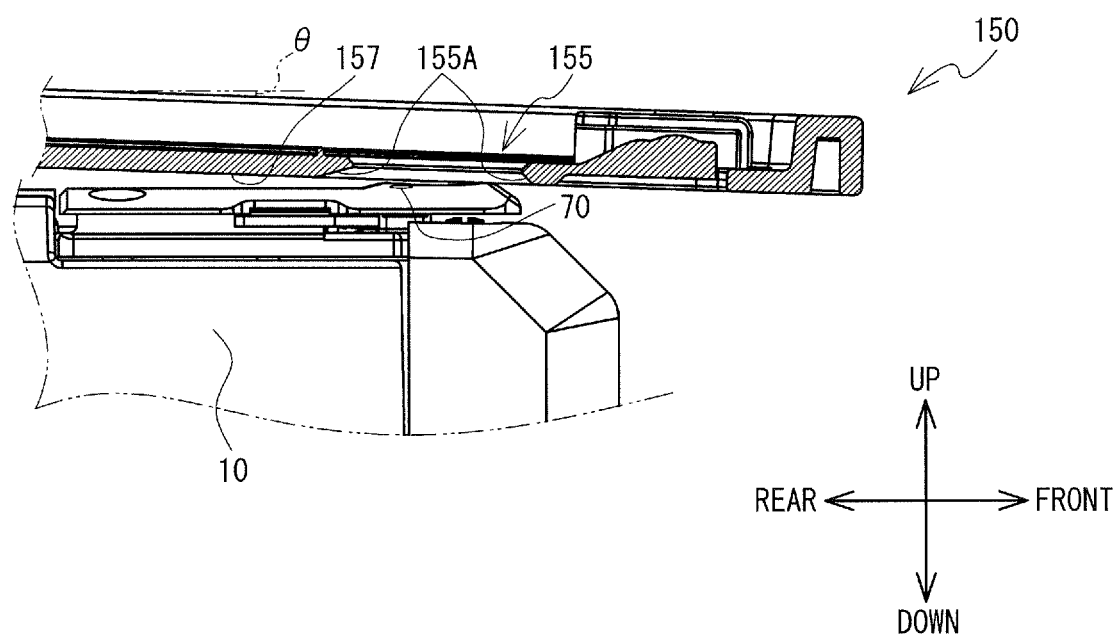
FIG. 11A is an explanatory view showing a flow in which the holder member is conveyed from an open position toward the front side, taken along line IV-IV in FIG. 3.
Figure 11B:
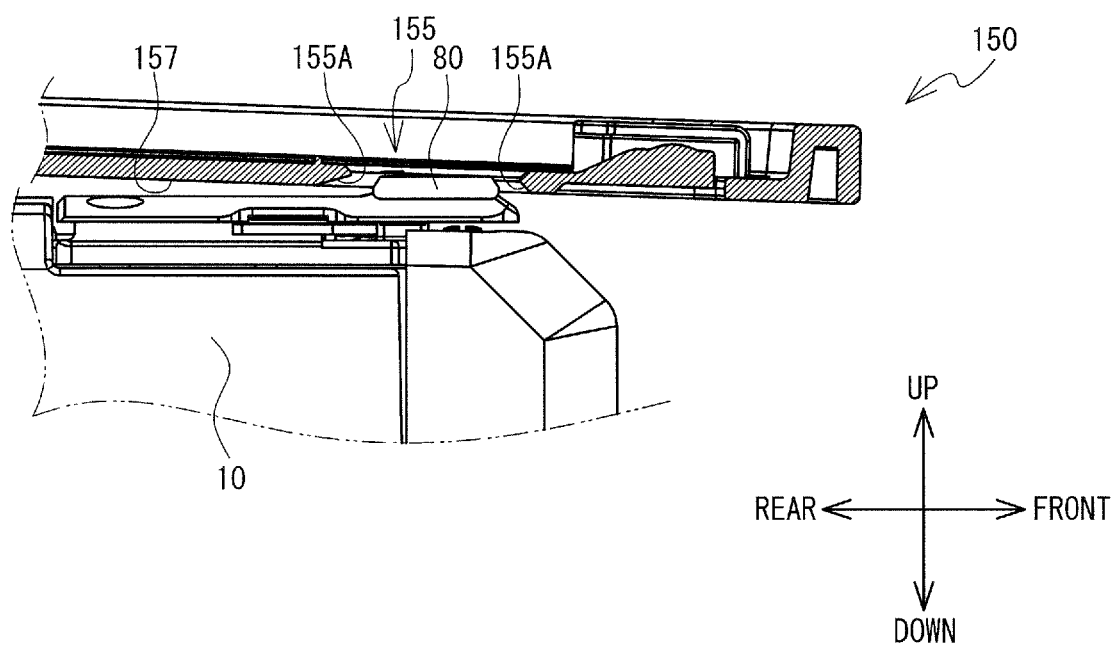
FIG. 11B is an explanatory view showing a flow in which the holder member is conveyed from an open position toward the front side, taken along line IV-IV in FIG. 3.
Figure 11C:
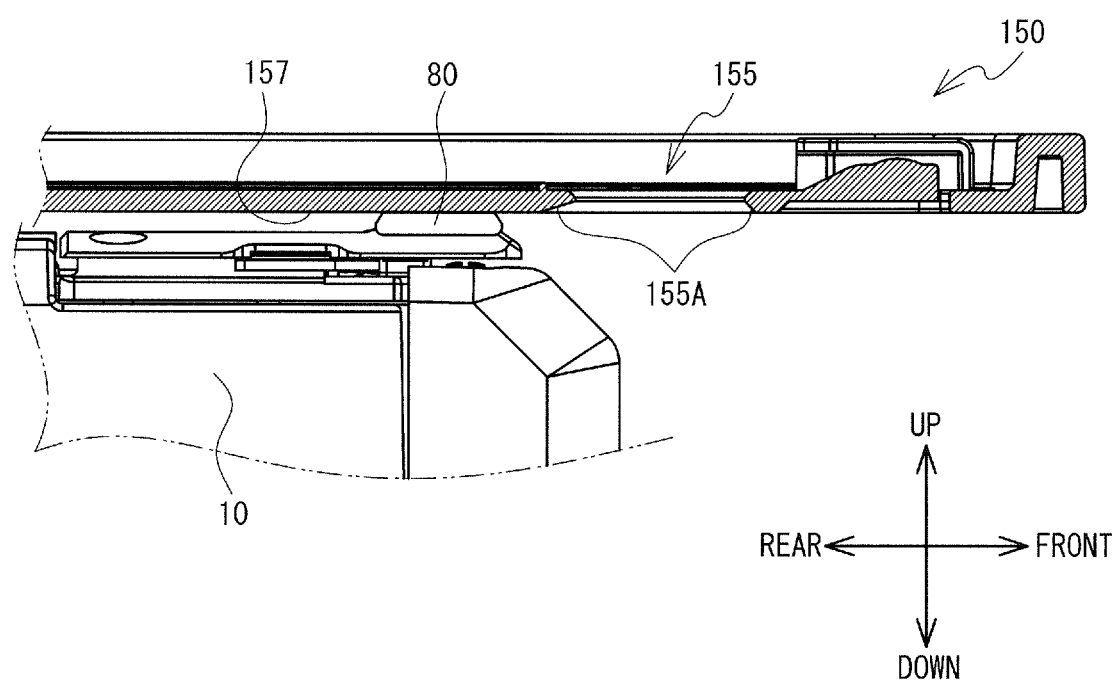
FIG. 11C is an explanatory view showing a flow in which the holder member is conveyed from an open position toward the front side, taken along line IV-IV in FIG. 3.

The holder member 150 has a plate shape that is generally rectangular in a plan view. The holder member 150 is provided with a pair of side portions 152, a holding region 154, a hole 155, a contact region 157 (refer to FIG. 11), a marker region 156, and a color reference member 160. The pair of side portions 152 are both end portions in the front-rear direction of the holder member 150, and are lined up in the front-rear direction. One of the pair of side portions 152 is fixed to the holder 24 by a screw member and the like (not shown in the drawings). In other words, one of the pair of side portions 152 is attached to the holder 24. The holding region 154 is a region corresponding to the generally center portion of the upper surface of the holder member 150, and has a rectangular shape in a plan view. The holding region 154 is surrounded by a rectangular frame 151 that protrudes slightly upward from the holder member 150. The user arranges the object of image capture 99 in contact with both the left side portion and the front side portion of the rectangular frame 151. As a result, the object of image capture 99 is held in the holding region 154 in a positioned state. In FIG. 3, the object of image capture 99 is shown by an alternate long and two short dashes line, but to make the drawing easier to see, the object of image capture 99 is shown separated from the rectangular frame 151. With the object of image capture 99 in the present example, six letters "A" to "F" are displayed one in each region on the upper surface of the object of image capture 99 that has been divided evenly into six regions.

The hole 155 passes through the holder member 150 in the up-down direction to the left of the holding region 154. An inclined surface 155A (refer to FIG. 11) is formed in the circumferential direction on the lower end portion of the hole 155. The inclined surface 155A is inclined so as to head downward the farther away the inclined surface 155A gets from the center of the hole 155. The contact region 157 (refer to FIG. 11) is a lower surface of the holder member 150, and is formed in a generally planar shape. The contact region 157 connects with the inclined surface 155A.

The marker region 156 (refer to FIG. 3) is provided to the rear of the hole 155. The marker region 156 in the present example is a raised portion formed on the upper surface of the holder member 150, and has a generally rectangular shape that is long in the front-rear direction in a plan view. The color reference member 160 is a sheet-like member affixed to the upper surface of the marker region 156, and is a member capable of reflecting light. The color reference member 160 includes a white reference member 161 having the color white, and a black reference member 162 having the color black. A black circular marker 164 is provided at the boundary between the white reference member 161 and the black reference member 162. In the present example, a plurality of the markers 164 all having the same shape are provided lined up at equidistant intervals in the front-rear direction. As an example, there are three of the markers 164.

An imaging unit 40 (refer to FIG. 6) is provided inside the arm portion 4. The imaging unit 40 is a well-known CMOS (Complementary Metal Oxide Semiconductor) image sensor, for example. The imaging unit 40 is a known area sensor in which a plurality of imaging elements (for example, a plurality of CMOS) lined up in a main scanning direction are arranged in a plurality of rows in a sub-scanning direction. In the present example, the main scanning direction corresponds to the Y-axis direction (front-rear direction) of the sewing machine 1, and the sub-scanning direction corresponds to the X-axis direction (the left-right direction) of the sewing machine 1. The imaging unit 40 has a predetermined image capture range 40A. The image capture range 40A has a rectangular shape in a substantially plan view. The center of the image capture range 40A is inside the needle hole 10A in a substantially plan view. The holder member 150 is conveyed relative to the imaging unit 40 in the front-rear direction and the left-right direction with the driving of the X-axis motor 132 and the Y-axis motor 134. As a result, the portion of the holder member 150 entering the image capture range 40A of the imaging unit 40 changes.

Figure 4:
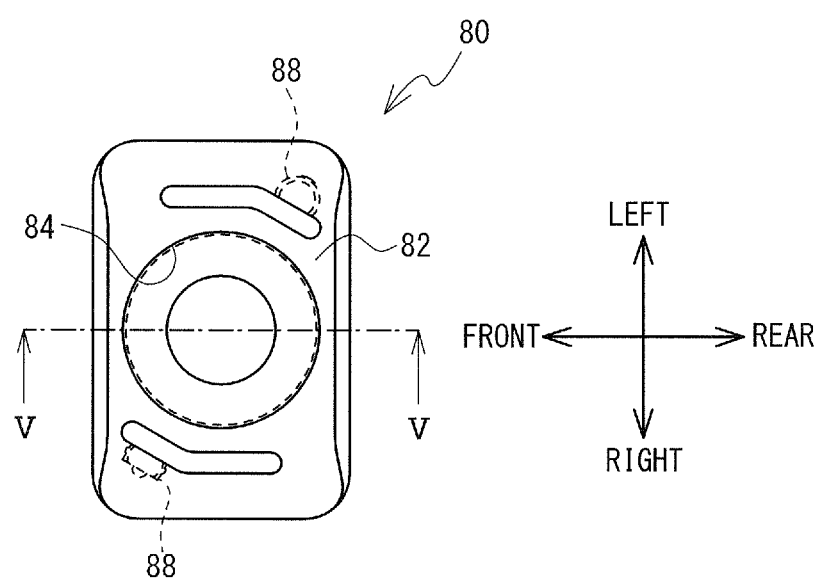
FIG. 4 is a plan view of a protruding member.
Figure 5:
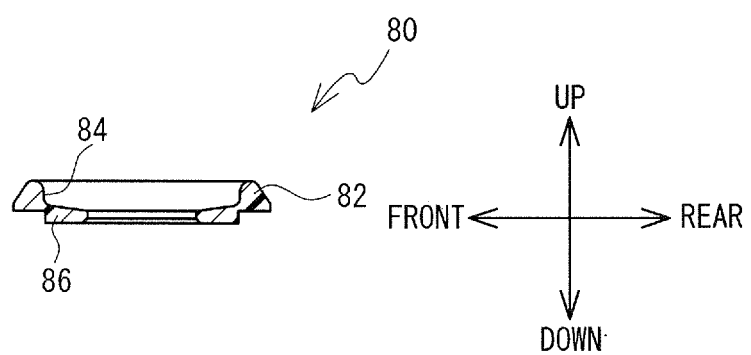
FIG. 5 is a sectional view of the protruding member taken along line V-V in FIG. 4.

The protruding member 80 will be explained with reference to FIG. 4 and FIG. 5. The protruding member 80 is formed by a resin member. The protruding member 80 is provided with a base portion 82, a recessed portion 84, a cylindrical portion 86, and two engaging portions 88. The base portion 82 has a plate shape that is generally rectangular. The recessed portion 84 is provided in the center portion of the upper surface of the base portion 82, and is recessed toward the lower surface of the base portion 82. The cylindrical portion 86 protrudes further downward from the lower end of the recessed portion 84. The internal space of the cylindrical portion 86 is communicated with the internal space of the recessed portion 84. The outer diameter of the cylindrical portion 86 is smaller than the outer diameter of the recessed portion 36 (refer to FIG. 1). The two engaging portions 88 are tabs that extend further downward from the lower surface of the base portion 82. The two engaging portions 88 are arranged in a straight line with the recessed portion 84 in between. In the present example, the two engaging portions 88 engage with the two mounting portions 70 (refer to FIG. 1), respectively, by a snap-fit structure.

Figure 6:
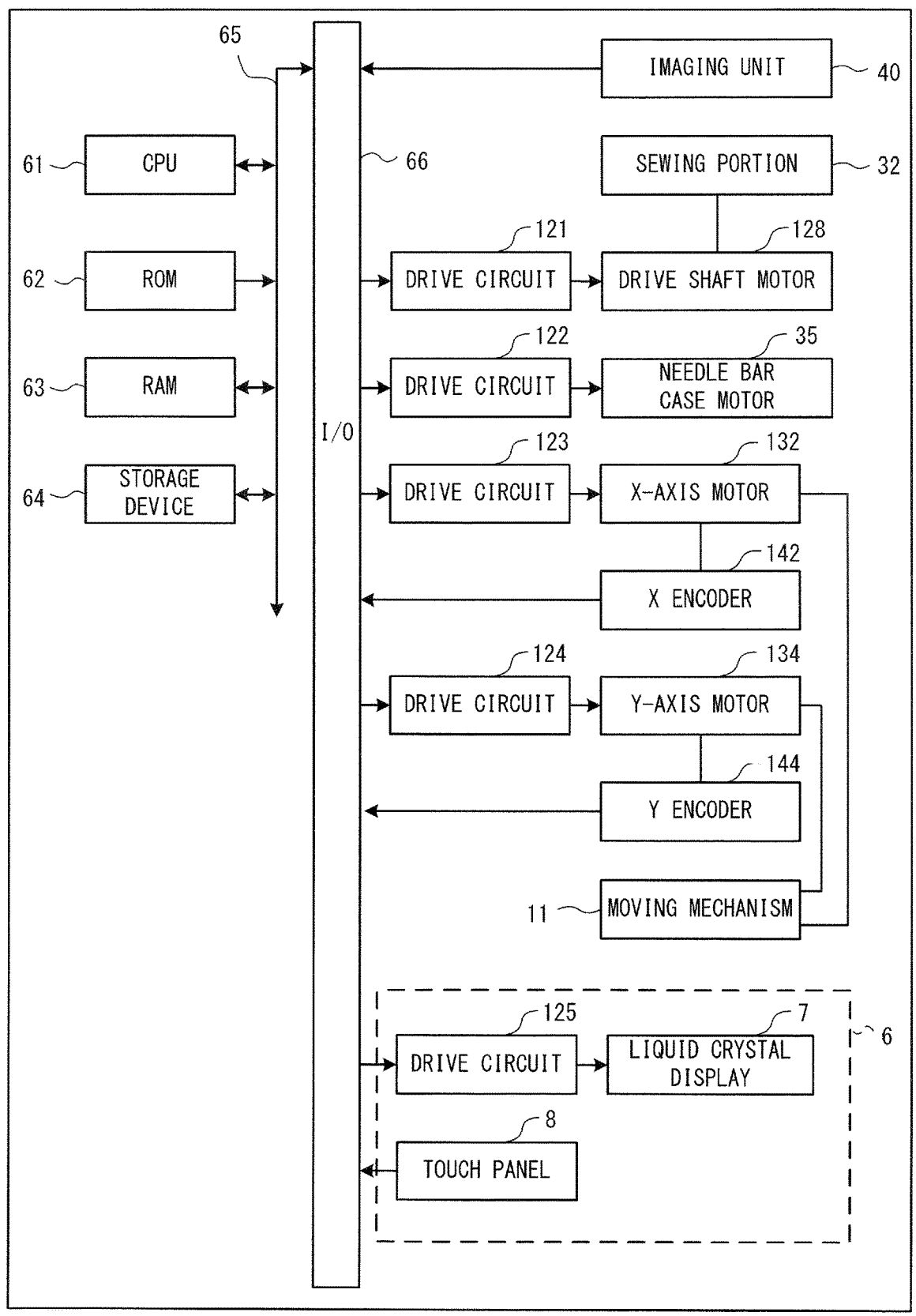
FIG. 6 is a block diagram showing an electrical configuration of the sewing machine.

The electrical configuration of the sewing machine 1 will be explained with reference to FIG. 6. The sewing machine 1 is provided with the CPU 61. The CPU 61 controls the operation of the sewing machine 1. The CPU 61 is connected to ROM 62, RAM 63, and a storage device 64, via a signal wire 65. The CPU 61 is connected to an input/output interface (I/O) 66 via the signal wire 65. The ROM 62 stores a program for the CPU 61 to execute main processing (refer to FIG. 7) that will be described later. In the RAM 63, a storage area for storing data such as the results of calculations performed by the CPU 61 is provided as necessary. The storage device 64 is non-volatile memory. The storage device 64 stores "n" indicating the specific number of images captured by the imaging unit 40, and the data of the images captured and generated by the imaging unit 40.

The CPU 61 is electrically connected to the imaging unit 40, drive circuits 121 to 125, and the touch panel 8, via the I/O 66. The imaging unit 40 outputs the captured and generated images to the CPU 61. The drive circuits 121 to 125 drive various motors on the basis of control signals transmitted from the CPU 61. More specifically, the drive circuit 121 drives a drive shaft motor 128, the drive circuit 122 drives the needle bar case motor 35, the drive circuit 123 drives the X-axis motor 132, and the drive circuit 124 drives the Y-axis motor 134. The X-axis motor 132 is connected to an X encoder 142. The X encoder 142 detects the rotational phase and rotation speed of an output shaft of the X-axis motor 132, and outputs the detection results to the CPU 61. The Y-axis motor 134 is connected to a Y encoder 144. The Y encoder 144 detects the rotational phase and rotation speed of an output shaft of the Y-axis motor 134, and outputs the detection results to the CPU 61. The drive shaft motor 128 drives the sewing portion 32, and the X-axis motor 132 and the Y-axis motor 134 drive the moving mechanism 11.

The drive circuit 125 causes the LCD 7 to display various information on the basis of a control signal transmitted from the CPU 61. The touch panel 8 detects various instructions input by the user, and outputs the detection results to the CPU 61.

The ROM 62 includes a calculation formula storage area (not shown in the drawings). In the calculation formula storage area are stored well-known calculation formulas for converting screen coordinates, which are a coordinate system of an image captured by the imaging unit 40, to coordinates in a world coordinate system. Hereinafter, an outline of the calculation formulas will be explained. In the present example, the origin in the world coordinate system is the needle hole 10A.

The screen coordinates will be (x, y), and the world coordinates will be (X, Y, and Z). In this case, Formula (A) is satisfied.

[Equation 1]

$$[x, y, 1] = [X, Y, Z, 1]P \qquad \text{Formula (A)}$$

In Formula (A), P is a 4×3 camera matrix, and is represented by Formula (B).

[Equation 1]

$$P = [R \mid t]K \qquad \text{Formula (B)}$$

[R |t] in Formula (B) is a determinant indicating an external parameter. [R |t] includes the rotation vector R and the translation vector t, for converting the screen coordinates to world coordinates. More specifically, [R |t] is represented by Formula (C).

[Equation 2]

$$[R \mid t] = \begin{bmatrix} R_{11} & R_{21} & R_{13} & t_x \\ R_{21} & R_{22} & R_{23} & t_y \\ R_{31} & R_{23} & R_{24} & t_z \end{bmatrix} \qquad \text{Formula (C)}$$

K in Formula (B) is a determinant indicating an internal parameter of the imaging unit 40, and is represented by Formula (D).

[Equation 3]

$$K = \begin{bmatrix} f_x & 0 & 0 \\ s & f_y & 0 \\ c_x & c_y & 1 \end{bmatrix} \qquad \text{Formula (D)}$$

$f_x$ and $f_y$ in Formula (D) are focal lengths of the imaging unit 40 in pixel units. $c_x$ and $c_y$ are optical centers (principal points) of the imaging unit 40 in pixel units. s is a shear coefficient in pixels. The internal matrix K in Formula (D) includes distortion coefficients and the like which are parameters that change in accordance with distortion of the lens of the imaging unit 40, but the internal matrix K is a known determinant, so a detailed description of the internal matrix K will be omitted.

The main processing will be explained with reference to FIG. 3, and FIG. 7 to FIG. 13. In the main processing, the degree of inclination of the holder member 150 is determined. If the degree of inclination is large, the image data of the object of image capture 99 image-captured by the imaging unit 40 is corrected to image data in which the degree of inclination has been reduced. Note that the holder member 150 in FIG. 11 is shown in a sectional view taken along line IV-IV in FIG. 3.

Hereinafter, to simplify the explanation, it will be assumed that the image capture range 40A of the imaging unit 40 is equivalent to ⅙ of the holding region 154. More specifically, it will be assumed that the length of the image capture range 40A in the front-rear direction is ½ the length of the holding region 154 in the front-rear direction, and the length of the image capture range 40A in the left-right direction is ⅓ the length of the holding region 154 in the left-right direction. Therefore, if the imaging unit 40 executes image-capturing six times while the holder member 150 is conveyed, the holding region 154 will be image-captured across the entire region.

Before the main processing is executed, the user fixes the holder member 150 to the holder 24, and places the object of image capture 99 on the holder member 150 (refer to FIG. 3). For example, if the user inputs, via a panel operation, an instruction to start the main processing, the CPU 61 will read the program for executing the main processing from the ROM 62, and execute the main processing.

Figure 7:
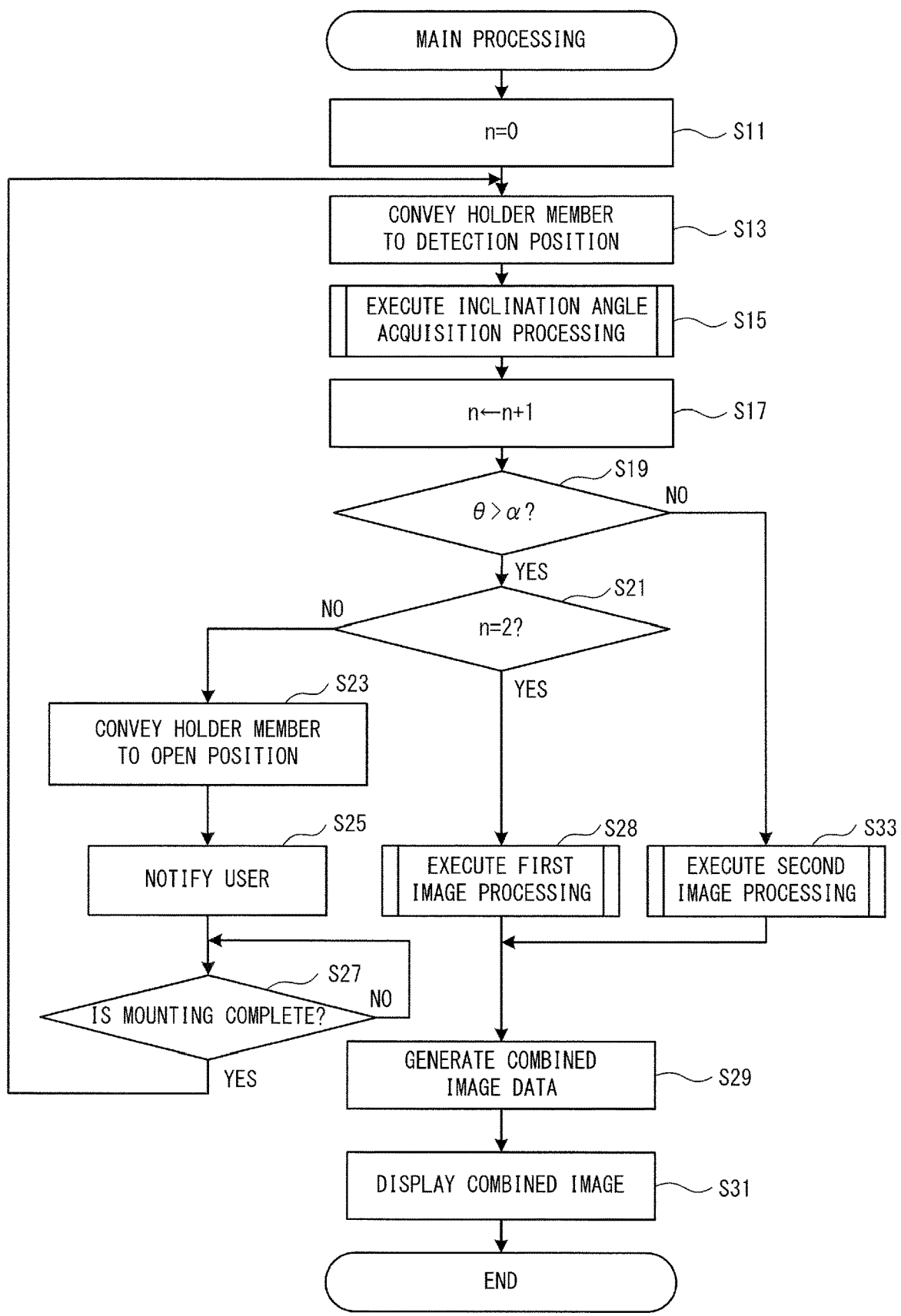
FIG. 7 is a flowchart of main processing.

As shown in FIG. 7, the CPU 61 overwrites "n" indicating the number of image-capturing is performed by the imaging unit 40, which is stored in the storage device 64, to "0", and stores overwritten "n" (step S11). The CPU 61 drives and controls the X-axis motor 132 and the Y-axis motor 134 to convey the holder member 150 to a detection position (not shown in the drawings) (step S13). The detection position is the position where the holder member 150 is arranged, where the three markers 164 are within the image capture range 40A. When the holder member 150 is at the detection position, the white reference member 161 and the black reference member 162 are within the image capture range 40A together with the three markers 164 (step S13).

The CPU 61 executes inclination angle acquisition processing (step S15). The inclination angle acquisition processing is processing by which the CPU 61 acquires an inclination angle θ of the holder member 150 (refer to FIG. 11A). The inclination angle θ is the angle at which the holder member 150 is inclined downward with respect to the front-rear direction. The X-axis driving mechanism supports the rear portion of the X carriage 22 by the substantially cantilevered structure, so the holder member 150 may incline downward due to empty weight of the holder member 150. More specifically, the front side of the holder member 150 inclines downward. When the object of image capture 99 is placed on the holder member 150, the holder member 150 tends to incline even further.

Figure 8:
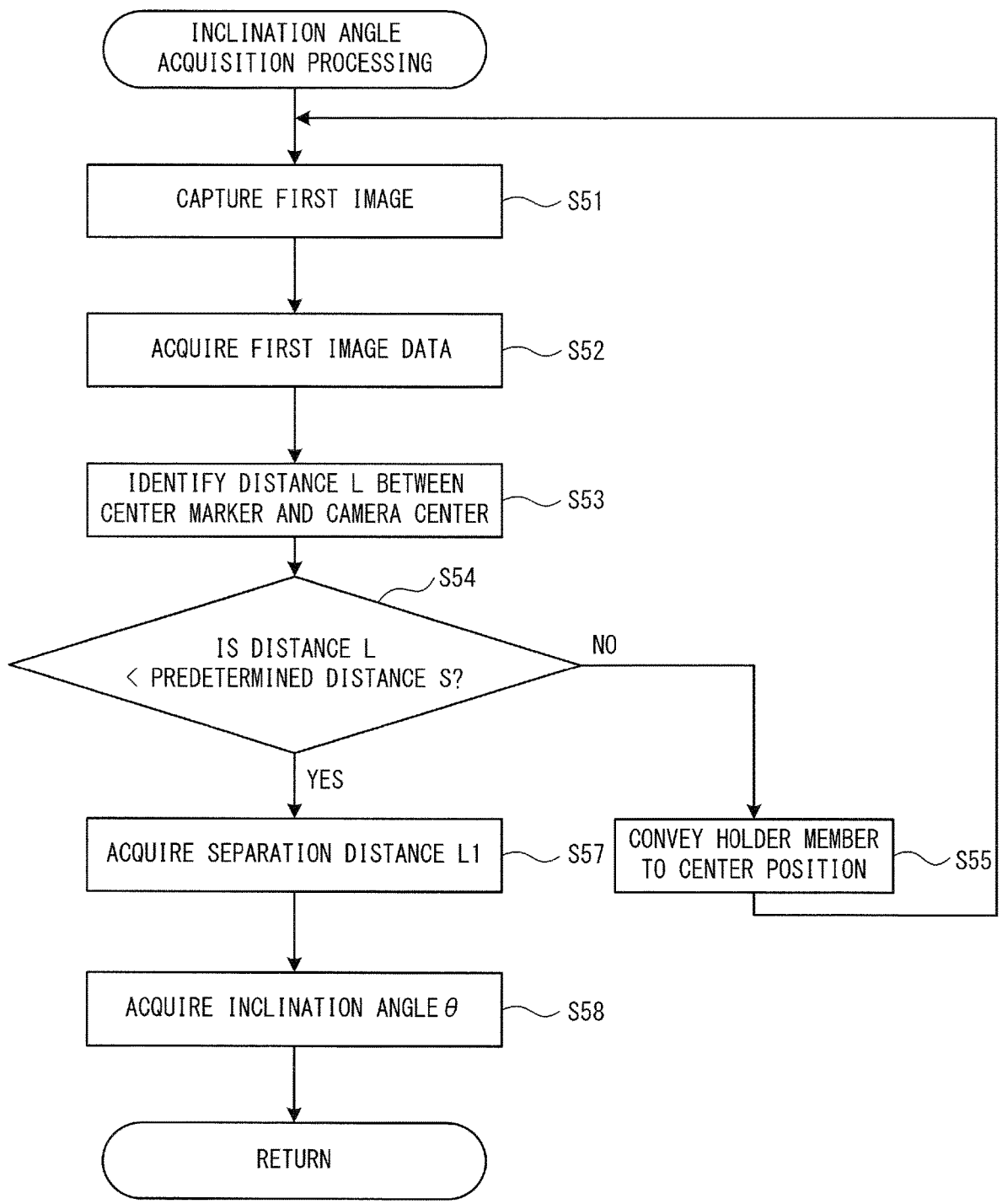
FIG. 8 is a flowchart of inclination angle acquisition processing.
Figure 9:
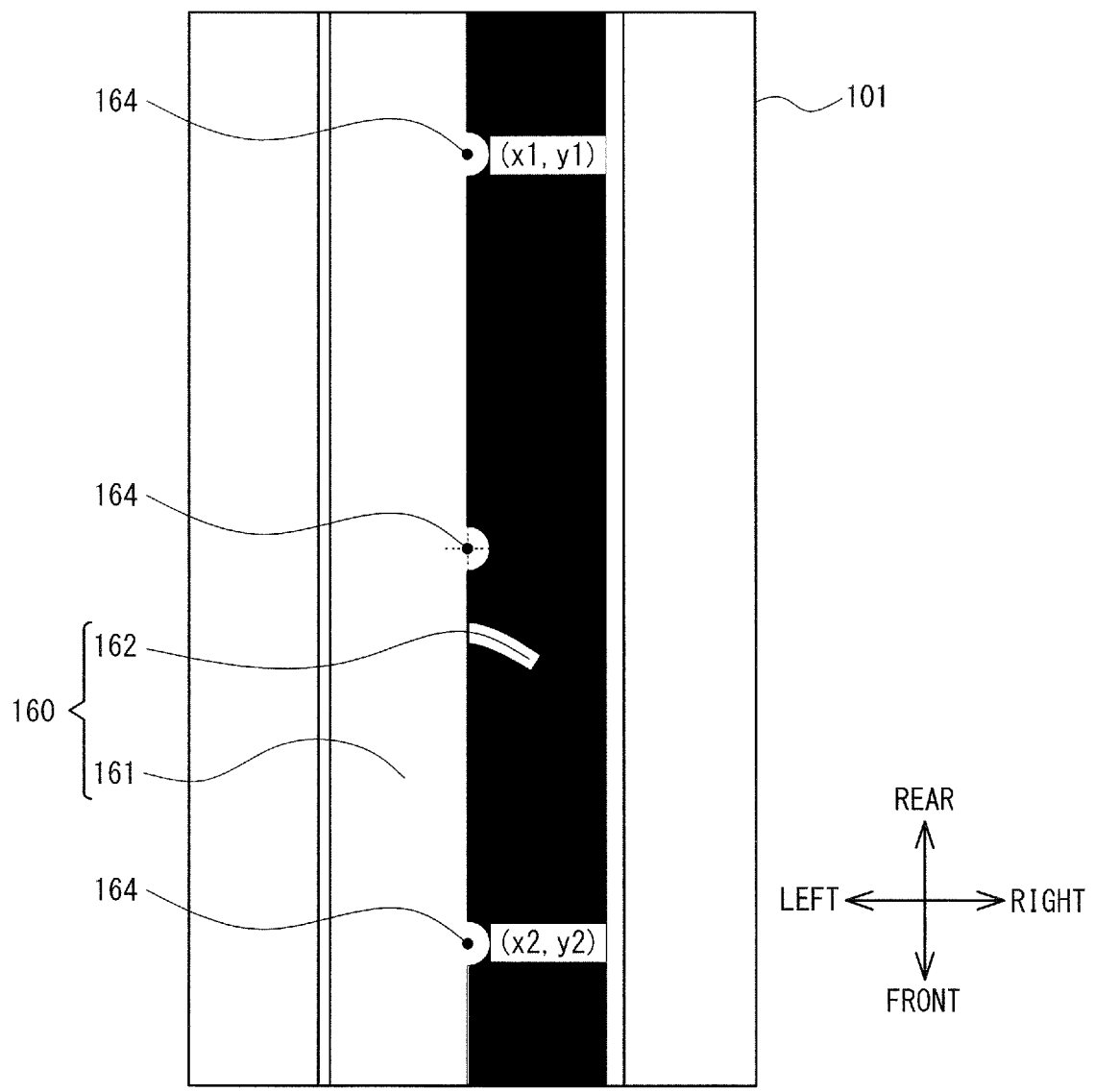
FIG. 9 is an explanatory view showing a first image when the holder member is in a center position.
Figure 10:
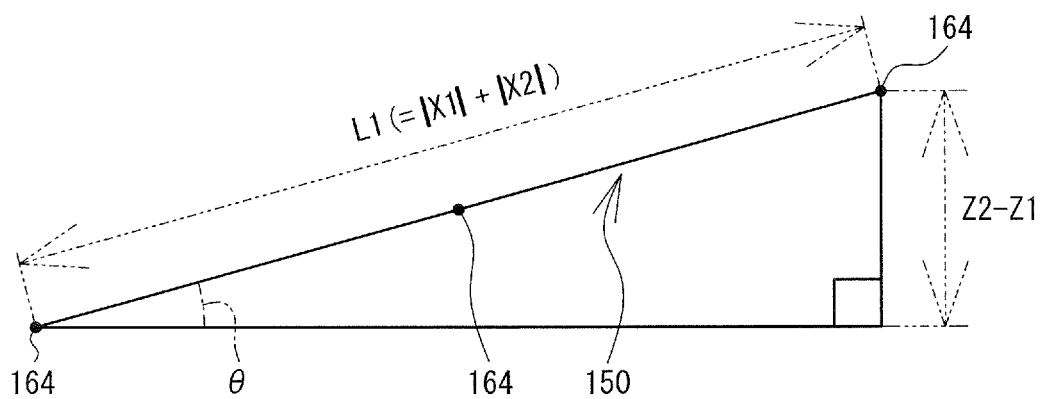
FIG. 10 is a conceptual diagram showing the degree of inclination of the holder member on an XZ plane of a world coordinate system.

As shown in FIG. 8 to FIG. 10, the CPU 61 causes the imaging unit 40 to capture an image of the three markers 164 and the color reference member 160 (step S51). The CPU 61 acquires first image data (step S52). The first image data is data of a first image 101 (refer to FIG. 9) showing the marker region 156 and the color reference member 160. The CPU 61 overwrites and stores the acquired first image data in the storage device 64 (step S52).

The CPU 61 identifies the distance L in the XY plane between the center marker 164 among the three markers 164, and the center position of the first image of the acquired first image data (step S53). The CPU 61 identifies the distance L by the method described below. The CPU 61 specifies the three markers 164 serving as feature points in the first image 101 by well-known image processing (for example, edge extraction). The CPU 61 acquires screen coordinates $(x_r, y_r)$ of the identified marker 164 in the center. The CPU 61 acquires world coordinates $(X_r, Y_r, Z_r)$ corresponding to the screen coordinates $(x_r, y_r)$ using Formula (A). The CPU 61 identifies the world coordinates $(X_R, Y_R, Z_R)$ corresponding to the center position of the first image 101. The world coordinates $(X_R, Y_R, Z_R)$ are stored in the ROM 62. The CPU 61 identifies the distance L using Formula (E) (step S53).

$$L=\{(X_R-X_r)^2+(Y_R-Y_r)^2\}^{1/2} \quad \text{Formula (E)}$$

The CPU 61 determines whether the distance L identified in step S53 is shorter than a predetermined distance S (step S54). The predetermined distance S is stored in the ROM 62. If the distance L is equal to or greater than the predetermined distance S (no at step S54), the CPU 61 drives the X-axis motor 132 and the Y-axis motor 134 to convey the holder member 150 to the center position (refer to FIG. 9) (step S55). The center position is the position where the holder member 150 is arranged, in which the center marker 164 coincides with the origin of the first image 101 (the center of the first image 101). The CPU 61 conveys the holder member 150 to the center position by the following method, for example. The CPU 61 calculates a conveyance amount for conveying the holder member 150 to the center position (refer to FIG. 9), on the basis of $(X_r, Y_r, Z_r)$ and $(X_R, Y_R, Z_R)$ acquired in step S53. The CPU 61 drives and controls the X-axis motor 132 and the Y-axis motor 134 while acquiring the detection results from the X encoder 142 and the Y encoder 144, such that the holder member 150 is conveyed by the calculated conveyance amount. As a result, the holder member 150 is conveyed to the center position (step S55). After executing step S55, the CPU 61 repeatedly executes steps S51 to S54 described above. The first image data stored in the storage device 64 is then overwritten (step S52). If the distance L is shorter than the predetermined distance S (yes at step S54), the CPU 61 moves the processing on to step S57.

The CPU 61 acquires a separation distance L1 (refer to FIG. 10) (step S57). The separation distance L1 is the shortest distance from the marker 164 on the front side to the marker 164 on the rear side, in the world coordinate system. The CPU 61 acquires the separation distance L1 by the following method, for example. The CPU 61 acquires the screen coordinates $(x_1, y_1)$ and $(x_2, y_2)$ of the two markers 164, on the basis of the first image data stored in the storage device 64 (refer to FIG. 9). The CPU 61 acquires the world coordinates $(X_1, Y_1, Z_1)$ and $(X_2, Y_2, Z_2)$ corresponding to the screen coordinates $(x_1, y_1)$ and $(x_2, y_2)$, respectively, using Formula (A). The CPU 61 acquires the separation distance L1 by substituting the acquired $X_1$ and $X_2$ into Formula (F) (step S57).

$$L1=|X_1|+|X_2| \quad \text{Formula (F)}$$

The CPU 61 acquires the inclination angle θ (refer to FIG. 10) on the basis of the separation distance L1 (step S58). The CPU 61 acquires the inclination angle θ by substituting L1, $Z_1$, and $Z_2$ acquired in the process of executing step S55 into Formula (G) (step S58).

$$\theta=\sin^{-1}(L1/Z_2-Z_1) \quad \text{Formula (G)}$$

The CPU 61 overwrites and stores the acquired inclination angle θ in the storage device 64 (step S58), and returns to the main processing.

As shown in FIG. 7 and FIG. 11A to FIG. 11C, the CPU 61 increases "n" incrementally (step S17), and then determines whether the inclination angle θ acquired in step S58 exceeds a predetermined value α (step S19). If the inclination angle θ exceeds the predetermined value α (yes at step S19), the CPU 61 determines whether "n" is "2" (step S21). If "n" is "1" (no at step S19), for example, the CPU 61 conveys the holder member 150 to an open position (refer to FIG. 11A) (step S23). The open position is a position where the holder member 150 is arranged where the hole 155 is above the mounting portions 70. When the holder member 150 is in the open position, the hole 155 opens the mounting portions 70 upward. That is, the mounting portions 70 are in a state not covered from above by the holder member 150. The CPU 61 drives the X-axis motor 132 and the Y-axis motor 134 to convey the holder member 150 from the center position to the open position while acquiring the detection results from the X encoder 142 and the Y encoder 144 (step S23).

The CPU 61 executes processing to notify the user that the inclination angle θ exceeds the predetermined value α (step S25). For example, the CPU 61 displays "HOLDING MEMBER INCLINED" on the LCD 7. The user recognizes that the holder member 150 is inclined, and recognizes that the protruding member 80 needs to be mounted to the mounting portions 70 of the sewing machine 1. The user then fits the cylindrical portion 86 of the protruding member 80 into the recessed portion 36 through the hole 155. Then, the user inserts the two engaging portions 88 into the two mounting portions 70 so that the two engaging portions 88 engage with the two mounting portions 70 respectively (refer to FIGS. 11A and 11B). As a result, the protruding member 80 is mounted to the mounting portions 70. The protruding member 80 that has been mounted to the mounting portions 70 protrudes above the upper surface of the cylinder bed 10. In this case, the upper end of the base portion 82 is positioned higher than the contact region 157 of the holder member 150.

The CPU 61 determines whether mounting of the protruding member 80 is complete (step S27). For example, the CPU 61 determines whether the touch panel 8 has detected information indicating that the mounting of the protruding member 80 is complete. The CPU 61 is placed in a standby state until the touch panel 8 detects information indicating that mounting is complete (no at step S27). After the holder member 150 has been mounted, the user operates the touch panel 8 and inputs an "OK" command, for example (yes at step S27). The CPU 61 then moves the processing on to step S13.

The CPU 61 conveys the holder member 150 from the open position to the detection position (step S13). The holder member 150 is conveyed toward the front side (step S13), and the base portion 82 of the protruding member 80 sequentially slides on the inclined surface 155A and the contact region 157 (refer to FIGS. 11B and 11C). The position in the front-rear direction where the protruding member 80 slides on the inclined surface 155A is on the opposite side from the holder 24 with respect to the color reference member 160. That is, the protruding member 80 slides on the inclined surface 155A at a position away from the position where the X carriage 22 is supported by the X-axis driving mechanism. Therefore, when the protruding member 80 slides on the inclined surface 155A, the load acting on the protruding member 80 is less. As a result, the protruding member 80 will easily enter the area below the contact region 157. The protruding member 80 that contacts the contact region 157 supports the holder member 150, so the holder member 150 is corrected to a position in which the inclination angle θ decreases. The holder member 150 is conveyed to the detection position with the inclination angle θ maintained (step S13).

The CPU 61 executes the inclination angle acquisition processing again (step S15). The CPU 61 overwrites and stores the acquired inclination angle θ in the storage device 64 (step S58). The CPU 61 incrementally increases "n" from "1" to "2" (step S17), and then executes step S19. If the inclination angle θ exceeds the predetermined value α (yes at step S19), "n" is "2" (yes at step S21), so the CPU 61 executes first image processing (step S28).

Figure 12:
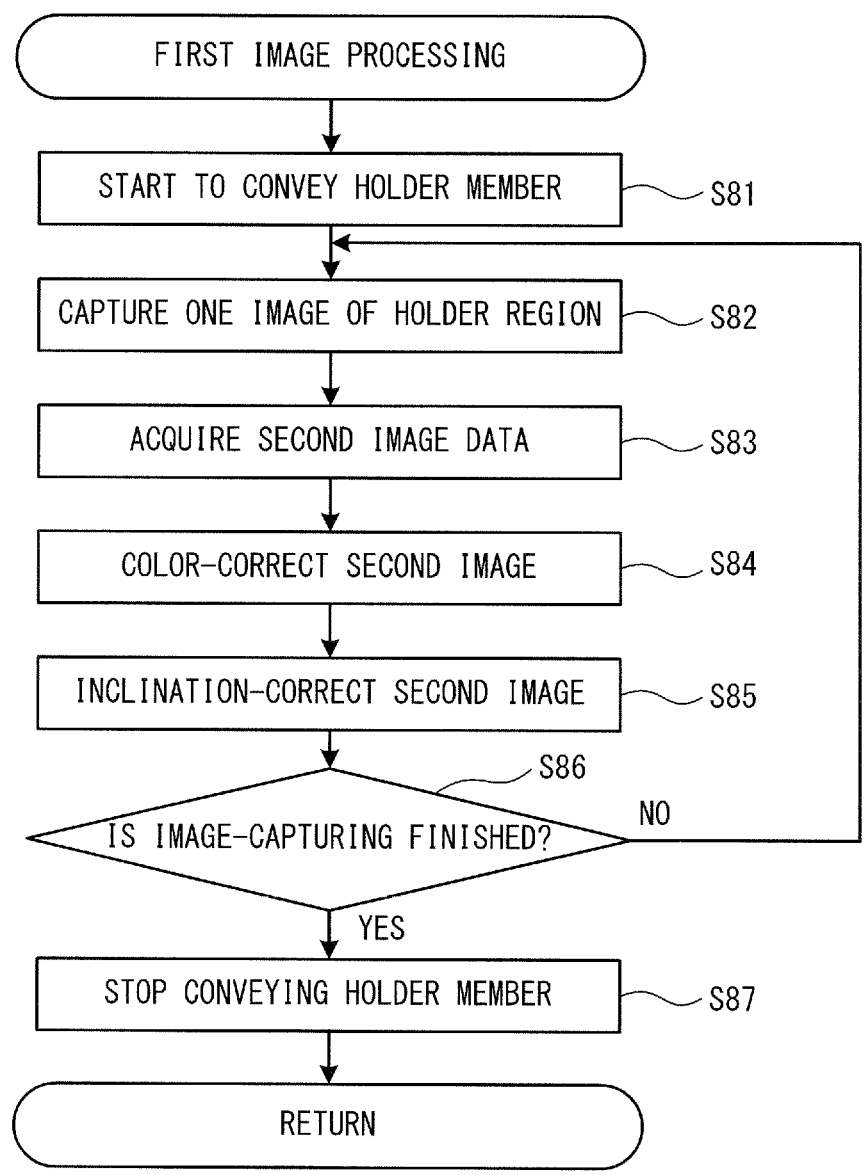
FIG. 12 is a flowchart of first image processing.
Figure 13:
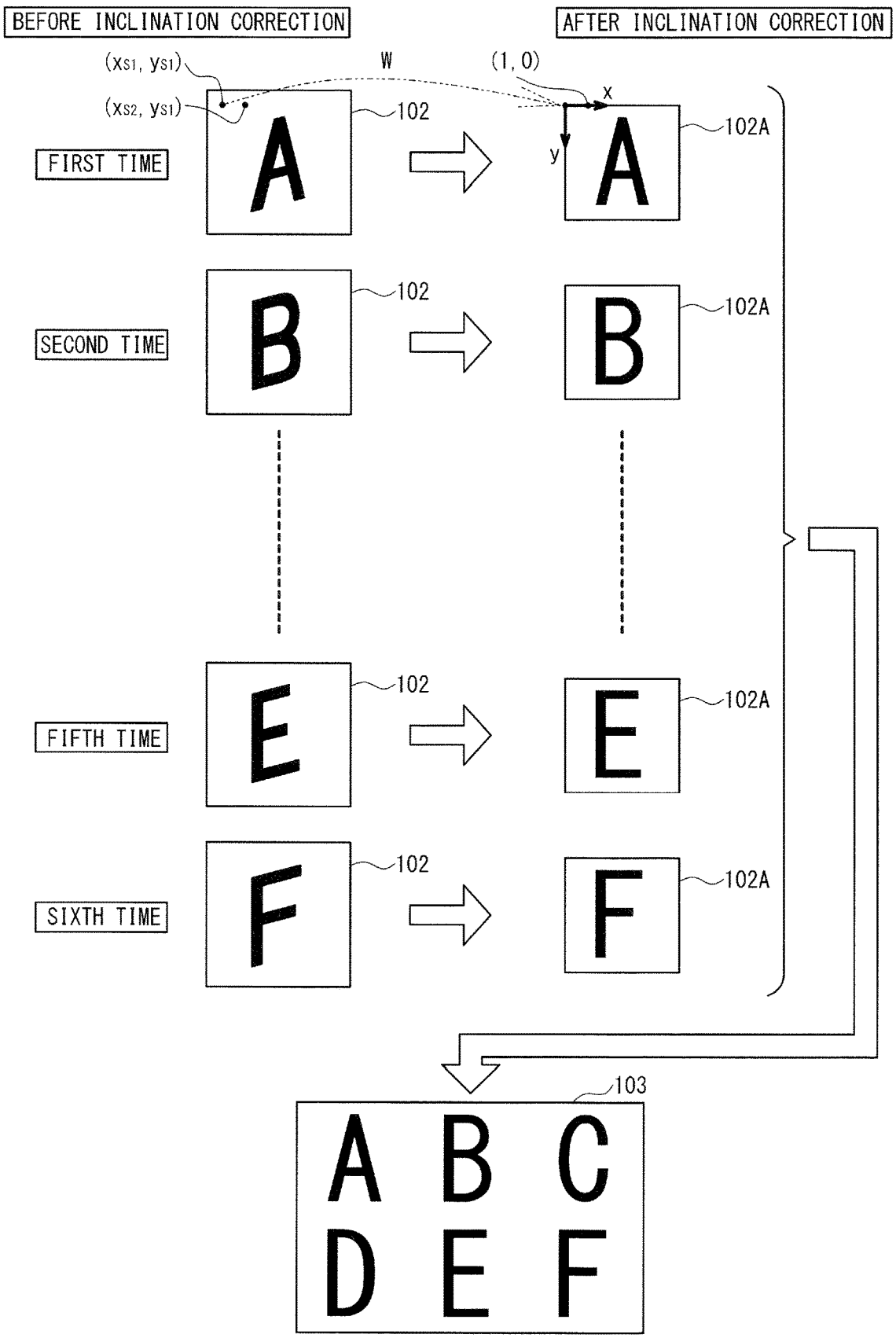
FIG. 13 is an explanatory view showing a flow in which second images are inclination-corrected and combined.

The first image processing the will explained with reference to FIG. 12, and FIG. 13. The first image processing is processing in which the sewing machine 1 image-captures the holding region 154 a plurality of times, and corrects the image data generated by the image-capturing. The CPU 61 drives the X-axis motor 132 and the Y-axis motor 134 while acquiring the detection results from the X encoder 142 and the Y encoder 144, and starts to convey the holder member 150 (step S81). The CPU 61 conveys the holder member 150 while moving the holding region 154 entering the image capture range 40A. More specifically, the CPU 61 first conveys the holder member 150 to a position where the left end and the rear end of the holding region 154 coincide with the left end and the rear end of the image capture range 40A, and then conveys the holder member 150 toward the left, and continues to convey the holder member 150 until the right end of the image capture range 40A coincides with the right end of the holding region 154. When the holder member 150 is conveyed until the right end of the image capture range 40A coincides with the right end of the holding region 154, the CPU 61 continues to convey the holder member 150 to a position where the left end and front end of the holding region 154 coincide with the left end and the front end of the image capture range 40A. The CPU 61 then continues to convey the holder member 150 toward the left, and conveys the holder member 150 until a position where the right end of the image capture range 40A coincides with the right end of the holding region 154. The image capture range 40A has a generally rectangular shape with the needle hole 10A in the center in a generally plan view, so the holder member 150 faces the mounting portions 70 from above while the holding region 154 enters the image capture range 40A. Therefore, while the holder member 150 is being conveyed (step S81), the protruding member 80 supports the contact region 157 from the lower side, and the holder member 150 is corrected to a posture in which the inclination angle θ decreases.

When the CPU 61 starts conveying the holder member 150 as described above, the CPU 61 controls the imaging unit 40 to capture one image (step S82). For example, the CPU 61 acquires the detection results from the X encoder 142 and the Y encoder 144, and detects the position of the holder member 150 in the left-right direction and the position of the holder member 150 in the front-rear direction. As a result, the CPU 61 waits to capture an image until a specific region of the holding region 154 has completely entered the image capture range 40A. The specific region is a region of the holding region 154 that is captured in one image-capturing by the imaging unit 40. The holding region 154 includes six specific regions. In the present example, the specific region is located directly below any of the six equally divided regions of the object of image capture 99. When the specific region has completely entered the image capture range 40A, the CPU 61 causes the imaging unit 40 to capture an image (step S82). That is, the CPU 61 waits to capture an image until a specific region of the holding region 154 that has not yet been image-captured fills the image capture range 40A. When the holder member 150 has been conveyed to a position where the specific region that has not yet been image-captured fills the image capture range 40A, the CPU 61 causes the imaging unit 40 to capture an image. As a result, the imaging unit 40 generates second image data (step S82). The second image data is data of a second image 102 (refer to FIG. 13) showing the partial image of the holding region 154 where the object of image capture 99 is placed. The CPU 61 acquires the second image data generated in step S82 (step S83). In the present example, the second image 102 includes any one of the letters "A" to "F" of the object of image capture 99.

The CPU 61 executes color correction to adjust the white balance value (WB value) of the second image data acquired in step S83 (step S84). The CPU 61 refers to the first image data acquired in step S52, and determines the WB value by a known method on the basis of the white reference member 161 and the black reference member 162 included in the first image. The CPU 61 color corrects the second image data using the determined WB value (step S84).

The CPU 61 execute inclination correction with respect to the second image data in which the WB value was corrected in step S84 (step S85). The inclination correction is processing to correct the second image data that was color corrected in step S84, to second image data that shows the second image 102 in which the inclination angle θ has been reduced. The CPU 61 generates inclination-corrected second image data (step S85). Hereinafter, the second image 102 that has been inclination-corrected will be referred to as the second image 102A, and the second image 102 indicates an image before the inclination correction.

The method by which the CPU 61 generates the image data of the second image 102A will now be explained. Hereinafter, to simplify the explanation, it is assumed that the second image 102A has a length of 40 mm in the X direction and a length of 60 mm in the Y direction in the world coordinate system. It is also assumed that the pixel interval of the second image 102A is 1 mm in the world coordinate system. Therefore, the second image 102A includes 41 pixels in the X direction, and 61 pixels in the Y direction.

The world coordinates $(-20, -30, Z_{S1})$ on the holder member 150 that is not inclined become $(-20, -30 \cos \theta, Z_{S1} -30 \sin \theta)$ when the holder member 150 is inclined by the inclination angle θ (not shown in the drawings). θ coincides with the inclination angle θ stored in the storage device 64. $Z_{S1}$ is a fixed value set in advance. The CPU 61 acquires the screen coordinates $(x_{S1}, y_{S1})$ of the second image 102, corresponding to the world coordinates $(-20, -30 \cos \theta, Z_{S1} -30 \sin \theta)$, using Formula (A) (refer to FIG. 13). The CPU 61 acquires the pixel at $(x_{S1}, y_{S1})$ of the second image data representing the second image 102, and sets the pixel at $(x_{S1}, y_{S1})$ as the origin of the second image 102A (arrow W). The origin of the second image 102A corresponds to the end in both the main scanning direction and the sub-scanning direction of the image.

The world coordinates $(-20, -29, Z_{S1})$ displaced in the Y direction by one pixel from the world coordinates $(-20, -30, Z_{S1})$ will now be examined. The world coordinates $(-20, -29, Z_{S1})$ become the world coordinates $(-20, -29 \cos \sigma, Z_{S1} -29 \sin \theta)$ with the inclination angle θ of the holder member 150. The CPU 61 performs processing similar to that described above and identifies the screen coordinates $(x_{S2}, y_{S1})$ of the second image 102, corresponding to $(-20, -29 \cos \theta, Z_{S1} -29 \sin \theta)$ (refer to FIG. 13). The CPU 61 acquires the pixel at the specified screen coordinates and sets the screen coordinates $(x_{S2}, y_{S1})$ as (1, 0) of the second image 102A.

The CPU 61 again repeats similar processing for each of the world coordinates $(-20, -28 \cos \theta, Z_{S1} -28 \sin \theta)$, $(-20, -27 \cos \theta, Z_{S1} -27 \sin \theta)$, . . . $(-20, -30 \cos \theta, Z_{S1} -30 \sin \theta)$, and $(-20, -31 \cos \theta, Z_{S1} -31 \sin \theta)$. As a result, the pixels at the screen coordinates (2, 0), (3, 0), . . . (60, 0), and (61, 0) of the second image 102A are set. That is, an image of one line along the X direction is generated.

The CPU 61 executes processing similar to that described above for coordinates one pixel off in the X direction in the world coordinate system and generates an image of one line. The CPU 61 generates the second image data representing the second image 102A by again repeating the processing. For example, in the first inclination correction, the second image data of the second image 102A representing the inclination-corrected "A" is generated (step S85). The CPU 61 continues to convey the holder member 150 while the processing of steps S83 to S85 is being performed. That is, the CPU 61 successively captures images of the holding region 154 while conveying the holder member 150, and corrects the images obtained by the image-capturing.

The CPU 61 determines whether the entire region of the holding region 154 has finished being image-captured (step S86). For example, the CPU 61 counts the cumulative number of times step S85 has been executed, and determines whether image-capturing has ended by determined whether the cumulative number has reached "6". The CPU 61 executes steps S82 to S86 until the cumulative number reaches "6" (no at step S86). As a result, the CPU 61 successively acquires the second image 102 representing each of "B" to "F", and performs inclination correction on the acquired second image 102 (step S85). The determination in step S86 is not executed after the processing in step S85 is complete. In other words, the processing in each of steps S83 to S85 indicates the start of the processing in each step, and does not mean that the processing in the next step cannot be started until the processing in each step is completed. That is, the CPU 61 continues to convey the holder member 150 until all of the specific regions of the holding region 154 have been image-captured, and captures images of the specific regions that have not yet been image-captured while conveying the holder member 150. Then, the CPU 61 moves the specific region that has not yet been image-captured to the image capture range 40A, by continuing to convey the holder member 150 even while the captured image is being corrected, and captures images of the specific regions that have not yet been image-captured. When image-capturing of the entire region of the holding region 154 by the imaging unit 40 has finished (yes at step S86), the CPU 61 stops conveying the holder member 150 (step S87), and ends the first image processing.

The CPU 61 then generates combined image data in which the six second images 102A have been combined (step S29). The CPU 61 generates combined image data according to the following method, for example. The CPU 61 generates image data of an image representing the rear half of the holding region 154 on the basis of the second image data of the three second images 102A representing "A", "B", and "C". Next, the CPU 61 generates image data representing the front half of the holding region 154 on the basis of the second image data of the three second images 102A representing "D", "E", and "F". The CPU 61 combines the image data representing the rear half of the holding region 154 and the image data representing the front half of the holding region 154. As a result, the CPU 61 generates combined image data that is data of a combined image 103 representing the entire region of the holding region 154 (step S29). The CPU 61 controls the LCD 7 to display the combined image 103 (step S31), and ends the main processing.

There may be a case in which the inclination angle θ has become less than the predetermined value a due to the protruding member 80 mounted on the mounting portions 70 supporting the holder member 150 (no at step S19), or a case in which the inclination angle θ of the holder member 150 is initially less than the predetermined value a without the protruding member 80 mounted on the mounting portions 70 (no at step S19). In these cases, the CPU 61 executes second image processing (step S33). In the second image processing, after the steps S81 to S84 of the first image processing are sequentially executed, steps S86 and S87 are sequentially executed without step S85 being executed. The description of the second image processing will be omitted to avoid redundancy in the description.

As described above, the CPU 61 acquires the separation distance L1 on the basis of the markers 164 identified from the first image data (step S52). The positional relationship of the three markers 164 in the first image changes according to the inclination angle θ. Therefore, the separation distance L1 is a variable that changes according to the degree of inclination of the holder member 150. The CPU 61 acquires the inclination angle θ on the basis of the separation distance L1 (step S58), and determines whether the inclination angle θ exceeds the predetermined value α (step S19). Thus, the sewing machine 1 capable of determining whether the object of image capture 99 placed on the holder member 150 is being held inclined is realized. Also, the markers 164 each having the same shape are provided lined up at equidistant intervals in the front-rear direction on the holder member 150. The three markers 164 are image-captured by the imaging unit 40. The positional relationship of the three markers 164 in the first image changes according to the inclination angle θ. Accordingly, the holder member 150 can cause the sewing machine 1 to acquire the separation distance L1 that is a variable correlated with the positional relationship of the three markers 164. Therefore, the holder member 150 that is attached to the X carriage 22 via the holder 24 can enable the sewing machine 1 to determine whether the object of image capture 99 is being held inclined.

In the first image processing, the CPU 61 carries out the inclination correction with respect to the second image data (step S85). Therefore, even if the holder member 150 that holds the object of image capture 99 becomes inclined, the CPU 61 causes the LCD 7 to display the combined image 103 in which the six second images 102A have been combined (step S31). Thus, the CPU 61 can make the combined image 103 of the second image 102 displayed by the LCD 7 good.

The CPU 61 starts inclination correction of the image-captured second image 102 (step S85) while the imaging unit 40 sequentially captures images of "A" to "F" (steps S82 to S86). The holder member 150 continues to move while the inclination correction of the second image 102 is being executed, so the timing at which the imaging unit 40 finishes capturing images of the second image 102 is earlier. As a result, the timing at which the inclination correction of the second image 102 is complete is earlier. Therefore, the sewing machine 1 can shorten the time required for the first image processing, so the timing at which the combined image 103 is generated can be earlier.

The CPU 61 executes a color correction on the basis of the color reference member 160 (step S84). Thus, the sewing machine 1 can make the second image 102A displayed by the LCD 7 even better. Also, the first image 101 shows the holding region 154 and the color reference member 160. The holding region 154 necessary to acquire the separation distance L1, and the color reference member 160 necessary to execute the color correction are both included in the first image 101. Therefore, the number of images captured by the imaging unit 40 is reduced. As a result, the sewing machine 1 can speed up the main processing.

If the inclination angle θ exceeds the predetermined value α (yes at S19), the protruding member 80 mounted on the mounting portions 70 supports the holder member 150 from the lower side. The protruding member 80 can correct the inclined holder member 150 to a posture in which the inclination angle θ is reduced. Also, when the CPU 61 conveys the holder member 150 to the open position (step S23), notification processing is executed (step S25). As a result, the user can be made aware that the inclination angle θ of the holder member 150 exceeds the predetermined value α.

As in the present example, when only one of the pair of side portions 152 is attached to the holder 24, the holder member 150 is likely be to inclined downward in the front-rear direction in which the pair of side portions 152 are arranged. The direction in which the three markers 164 are arranged coincides with the front-rear direction in which the pair of side portions 152 are arranged. As a result, the separation distance L1 easily changes according to the degree of inclination of the holder member 150. Thus, the sewing machine 1 can accurately determine whether the inclination angle θ exceeds the predetermined value α.

The sewing machine 1 determines whether the inclination angle θ exceeds the predetermined value α on the basis of the separation distance L1 between the two markers 164. The separation distance L1 can be increased while reducing the region where the markers 164 are arranged, by separating the markers 164 from one another. When the separation distance L1 is increased, the amount of change in the separation distance L1 with respect to the amount of change of the inclination angle θ increases. Thus, the CPU 61 can easily acquire the inclination angle θ with high accuracy.

The embodiment described above can be modified in a variety of ways. The configuration of the sewing machine 1 may be a configuration in which a single needle bar 31 is provided, instead of a configuration in which the plurality of needle bars 31 are provided. Both of the pair of side portions 152 of the holder member 150 may be fixed to the holder 24, instead of one of the pair of side portions 152 of the holder member 150 being fixed to the holder 24. In this case as well, the X-axis driving mechanism supports the left portion of the X carriage 22 by the substantially cantilevered structure, so the holder member 150 will become inclined.

When the holder member 150 is in the open position, the hole 155 does not have to be above the mounting portions 70. For example, the holder member 150 that is in the open position may be arranged in a position offset with respect to the mounting portions 70 in one of the right, left, front, or rear directions. In this case as well, the holder member 150 that is in the open position opens the mounting portions 70 upward.

The markers 164 may be formed as white circular dots and provided on the upper surface of the black reference member 162. The color of the markers 164 may be different from white and black. The number of markers 164 may be one or two, or four or more. For example, if the number of markers 164 is one, the marker 164 may be shaped long in the front-rear direction. In this case, the length in the front-rear direction of the marker 164 in the first image will be a variable that changes according to the degree of the inclination angle θ of the holder member 150. Therefore, the CPU 61 acquires the inclination angle θ on the basis of the length in the front-rear direction of the marker 164, instead of the separation distance L1.

The CPU 61 does not have to execute the inclination correction according to the inclination angle θ acquired in step S57. For example, the CPU 61 may correct the inclination such that the inclination angle θ of the second image 102 appears to be reduced by an angle β (step S85). The angle β is a fixed value set in advance. The CPU 61 may execute the inclination correction in parallel with the first image processing, instead of executing the inclination correction with the first image processing. That is, the CPU 61 may execute step S85 which is processed in parallel with the first image processing, without executing step S85 in the first image processing. In this case, in the first image processing, image-capturing by the imaging unit 40 is executed without waiting for the inclination correction to end (no at step S86, step S82). As a result, the timing at which the image-capturing by the imaging unit 40 ends is even earlier.

The CPU 61 may carry out a known shading correction with respect to the second image data on the basis of the first image data, for example, instead of executing the color correction that adjusts the white balance (step S84). In this case, color unevenness and illuminance unevenness of the second image 102A are reduced compared to before the correction.

The CPU 61 does not have to execute steps S11, S17, and S21 to S27 in the main processing. In this case, the CPU 61 may move the processing to step S28 when the determination in step S19 is "yes" (yes at step S19). In this case as well, the sewing machine 1 can acquire the inclination angle θ of the holder member 150, and can execute inclination correction of the second image 102. The CPU 61 does not have to execute the first image processing (step S28) in the main processing. In this case, after executing step S19, the CPU 61 need simply execute steps S23, S25, S27, and S33 in order, and does not need to execute steps S11, S17, and S21. In this case as well, if the inclination angle θ exceeds the predetermined value α (yes at step S19), the inclination angle θ is reduced by the protruding member 80 supporting the holder member 150 (yes at S27; step 13). Therefore, the CPU 61 can execute the second image processing in a state in which the inclination angle θ has been reduced (step S33). The CPU 61 does not have to execute steps S11, S17 to S27, and S33 in the main processing. That is, after executing step S15, the CPU 61 may move the processing to step S28. In this case, the first image processing (step S28) is always executed on the basis of the inclination angle θ, and the inclination angle θ can be reduced.

The separation distance L1 is a variable that changes according to the degree of inclination of the holder member 150, similar to the inclination angle θ. Therefore, the CPU 61 may execute processing to determine whether the separation distance L1 is less than a predetermined distance, instead of executing step S55. The predetermined distance is a fixed value set in advance. In this case as well, the CPU 61 executes processing that is virtually the same as the processing to determine whether the inclination angle θ exceeds the predetermined value α.

The CPU 61 does not have to execute the color correction processing (step S84) in the first image processing and the second image processing. The CPU 61 does not have to execute the combining processing of the second image 102A (step S29) in the main processing. In this case, the CPU 61 may cause the LCD 7 to display, one by one, the second images 102A represented by the six sets of second image data, instead of executing step S31.

The CPU 61 may combine a plurality of the second images 102, and inclination-correct the combined second image 102, instead of inclination-correcting each of the six second images 102. The plurality of second images 102 are three second images 102 that have been captured in succession, for example. The three second images 102 that were successively captured include the three letters "A", "B", and "C", or "D", "E", and "F". The CPU 61 determines whether the second image data that represents the three successive second images 102 has been acquired, after executing step S83 and before executing step S84. If the determination is "no", the CPU 61 executes step S86 without executing S84 and S85. On the other hand, if the determination is "yes", the CPU 61 combines the three successive second images 102 before executing step S84. The CPU 61 executes color correction and inclination correction with respect to the image data representing the combined images (steps S84 and S85). The CPU 61 causes the imaging unit 40 to capture images of the specific regions not yet captured, while the combined image is being inclination-corrected. The CPU 61 acquires image data representing the two combined images that have been inclination-corrected, by repeating the processing described above. The CPU 61 generates a combined image in which the two combined images have been further combined, after executing step S86 and before executing step S87, for example.

Figure 14:
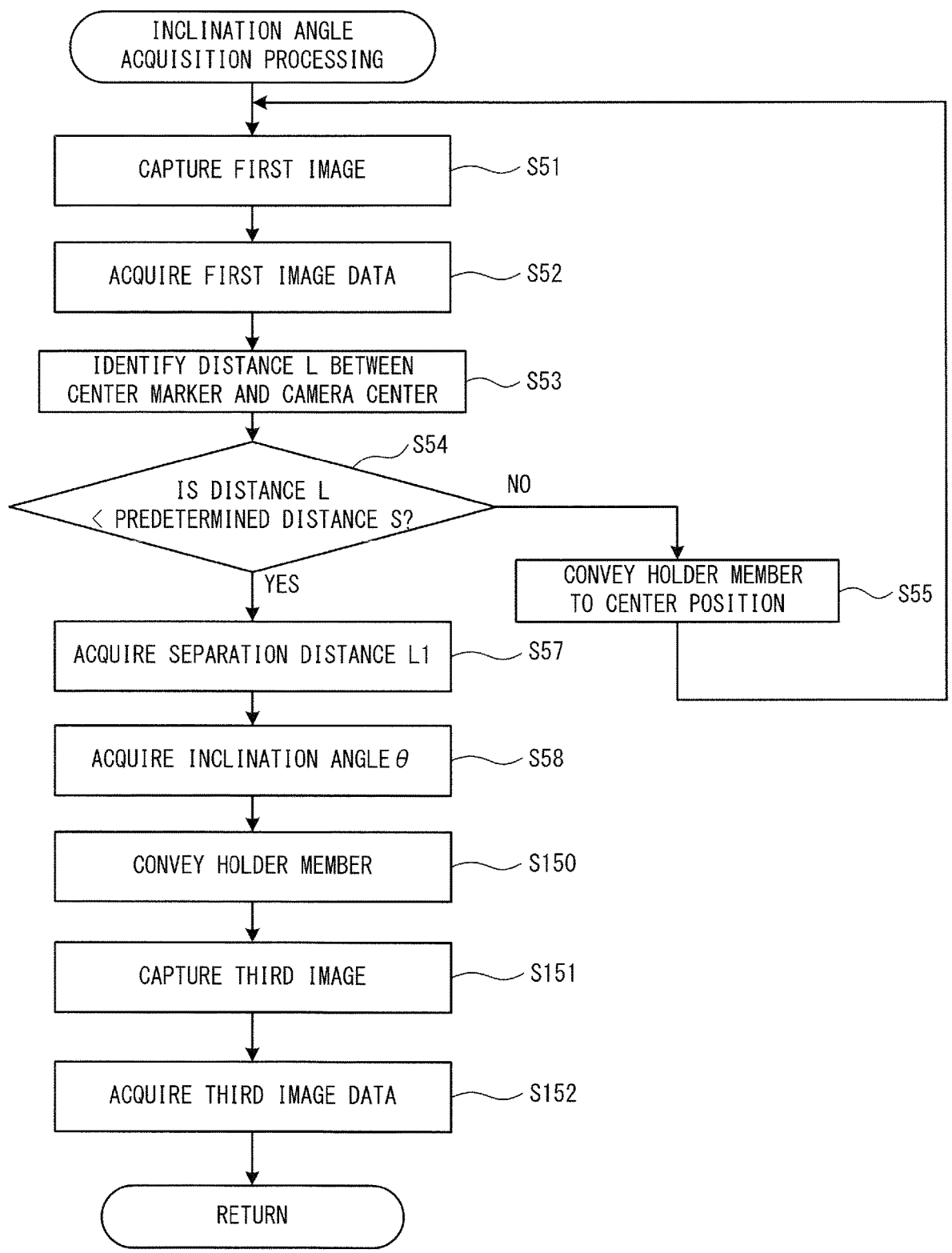
FIG. 14 is a flowchart of inclination angle acquisition processing according to a modified example.

The markers 164 do not have to be provided on the color reference member 160. For example, the markers 164 and the color reference member 160 may have a positional relationship in which the markers 164 and the color reference member 160 do not enter the image capture range 40A at the same timing. In this case, the CPU 61 may execute inclination angle acquisition processing shown in FIG. 14. In the inclination angle acquisition processing according to a modified example, steps S150 to S152 are executed after steps S51 to S58 described above are executed. In this case, the CPU 61 captures a first image 101 that includes the markers 164 in step S51. The CPU 61 can acquire the separation distance L1 on the basis of the first image data acquired in step S52 (step S57). After executing step S58, the CPU 61 conveys the holder member 150 to a position where the color reference member 160 enters the image capture range 40A (step S150). The CPU 61 captures a third image that is an image including the color reference member 160 (step S151), and acquires third image data that is data representing the third image (step S152). In this case, the CPU 61 executes the color correction (step S84) on the basis of the acquired third image data. Because color correction is executed, the sewing machine 1 can make the second image 102A displayed on the LCD 7 good. In the processing of step S21, if "n" becomes 1 (no at step S21), the inclination angle acquisition processing (step S15) is executed again without the color correction (step S84) being executed, so the processing of steps S150 to S152 in the first cycle of the inclination angle acquisition processing is not necessary. Therefore, after the processing in step S58, "n" is increased incrementally, and when the inclination angle θ obtained in step S58 becomes larger than the predetermined value α (yes at step S19) and the incrementally increased "n" becomes "2" (yes at step S21), steps S150 to S152 may be executed. In this case, the processing of step S17 is omitted.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A sewing machine provided with a sewing portion that sews a sewing object, the sewing machine comprising:
an imaging unit having a predetermined image capture range, and configured to capture an image of a holder member, the holder member being configured to hold an object of image capture;
a conveyor portion configured to convey the holder member relative to the imaging unit in a first direction and a second direction that are different from each other;
a processor; and
a memory stores computer-readable instructions that, when executed by the processor, instruct the sewing machine to perform processes comprising:
causing the imaging unit to capture the image of the holder member that has entered the image capture range by controlling the imaging unit and the conveyor portion;
acquiring first image data that is data of a first image representing the image of the holder member that was captured by the imaging unit;
identifying a predetermined marker from the first image of the acquired first image data; and
determining whether an inclination angle of the holder member exceeds a predetermined value on the basis of a variable acquired on the basis of the identified marker, the variable being a variable corresponding to a degree of inclination of the holder member that inclines with respect to the first direction, the holder member being inclined toward a third direction orthogonal to the first direction and the second direction.

2. The sewing machine according to claim 1, further comprising:
a display portion that displays an image,
wherein
the holder member includes a marker region where the marker is provided and a holding region where the object of image capture is held,
the causing the imaging unit to capture the image of the holder member includes:
causing the imaging unit to capture an image of the marker region; and
causing the imaging unit to capture an image of the holding region,
the acquiring includes acquiring the first image data and second image data, the first image data being data of the first image representing the marker region captured by the imaging unit, and the second image data being data of a second image representing the holding region captured by the imaging unit, and
wherein
the computer-readable instructions, when executed by the processor, further instruct the sewing machine to perform processes comprising:
correcting the acquired second image data to corrected second image data representing the second image in which the inclination angle has been reduced, in response to determining that the inclination angle exceeds the predetermined value; and
displaying the corrected second image represented by the corrected second image data on the display portion.

3. The sewing machine according to claim 2, wherein
the causing the imaging unit to capture the image of the holding region includes causing the imaging unit to capture a plurality of images of the holder member while moving the holding region entering the image capture range, the holder member being moved relative to the imaging unit,
the acquiring includes:
acquiring the first image data; and
starting to acquire the second image data while the imaging unit is capturing the image of the holder member, after determining whether the inclination angle exceeds the predetermined value,
the correcting includes:
starting to correct a plurality of the acquired second image data to a plurality of the corrected second image data while the imaging unit is capturing the image of the holder member, and
the computer-readable instructions, when executed by the processor, further instruct the sewing machine to perform process comprising:
generating combined image data in which the plurality of the corrected second image data is combined.

4. The sewing machine according to claim 2, wherein
the holder member includes a color reference member having a predetermined color,
the causing the imaging unit to capture the image of the holder member includes causing the imaging unit to capture an image of the color reference member,
the acquiring the first image data includes acquiring third image data that is data of a third image representing the color reference member captured by the imaging unit, and
the correcting includes correcting a color of the second image captured by the imaging unit on the basis of the acquired third image data.

5. The sewing machine according to claim 2, wherein
the holder member includes a color reference member provided in the marker region and having a predetermined color,
the causing the imaging unit to capture the image of the marker region includes causing the imaging unit to capture an image of the marker region and the color reference member,
the acquiring the first image data includes acquiring fourth image data that is data of a fourth image representing the marker region and the color reference member, and
the correcting includes correcting a color of the second image captured by the imaging unit on the basis of the acquired fourth image data.

6. The sewing machine according to claim 1, further comprising:
a table arranged spaced apart from the holder member in the third direction; and
a mounting portion provided on the table, and that is a portion to which a protruding member detachably attaches, the protruding member protruding from the table toward one side in a state in which the protruding member attached to the mounting portion, the one side end of the protruding member slidably contacting the holder member in a state in which the protruding member attached to the mounting portion,
wherein
the computer-readable instructions, when executed by the processor, further instruct the sewing machine to perform process comprising:
causing the holder member to move to a position facing the mounting portion in the third direction, in response to determining that the inclination angle exceeds the predetermined value and after moving the holder member to an open position where the mounting portion is open to the one side by controlling the conveying portion, and
the causing the imaging unit to capture the image of the holder member includes causing the imaging unit to capture an image of the holder member in a state in which the protruding member mounted on the table is contacting the holder member, in response to determining that the inclination angle exceeds the predetermined value.

7. The sewing machine according to claim 1, wherein
the computer-readable instructions, when executed by the processor, further instruct the sewing machine to perform process comprising:
notifying a user that the inclination angle exceeds the predetermined value in response to determining that the inclination angle of the holder member exceeds the predetermined value.

8. The sewing machine according to claim 1, wherein
the holder member is provided with a pair of side portions that extend in the second direction and are arranged in the first direction,
one of the pair of side portions is held by the conveying portion, and
a plurality of the markers is arranged spaced apart from each other in the first direction.

9. The sewing machine according to claim 8, wherein
the determining includes determining whether the inclination angle exceeds the predetermined value using a distance between identified plurality of markers as the variable.

* * * * *